United States Patent
Chun et al.

(10) Patent No.: US 10,986,526 B2
(45) Date of Patent: Apr. 20, 2021

(54) METHOD AND TERMINAL FOR TRANSMITTING DATA TRAFFIC IN WIRELESS COMMUNICATION SYSTEM

(71) Applicant: LG ELECTRONICS INC., Seoul (KR)

(72) Inventors: Sungduck Chun, Seoul (KR); Laeyoung Kim, Seoul (KR); Jaehyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 15/572,728

(22) PCT Filed: May 26, 2016

(86) PCT No.: PCT/KR2016/005558
§ 371 (c)(1),
(2) Date: Nov. 8, 2017

(87) PCT Pub. No.: WO2016/190670
PCT Pub. Date: Dec. 1, 2016

(65) Prior Publication Data
US 2018/0160331 A1    Jun. 7, 2018

Related U.S. Application Data

(60) Provisional application No. 62/166,142, filed on May 26, 2015.

(51) Int. Cl.
*H04W 28/02*  (2009.01)
*H04W 60/04*  (2009.01)
(Continued)

(52) U.S. Cl.
CPC ..... *H04W 28/0215* (2013.01); *H04L 41/0681* (2013.01); *H04W 48/12* (2013.01);
(Continued)

(58) Field of Classification Search
CPC . H04W 28/0215; H04W 60/04; H04W 76/18; H04W 48/12; H04W 48/02;
(Continued)

(56) References Cited

U.S. PATENT DOCUMENTS 8,312,507 B2 * 11/2012 Chen ............... H04L 63/102
  726/1
8,554,179 B2 * 10/2013 Pecen ............... H04L 63/101
  455/411

(Continued)

FOREIGN PATENT DOCUMENTS

KR    10-2006-0019799 A    3/2006
KR    10-2013-0065879 A    6/2013
(Continued)

OTHER PUBLICATIONS

3GPP TR22.818 V1.0.0, Dec. 17, 2014: Third generation partnership project; Technical Specification group services and system aspects; Feasibility study on control of applications when Third-party servers encounter difficulties, Valbonne, France, (pp. 1-22) 2014.

(Continued)

*Primary Examiner* — Patrice L Winder
(74) *Attorney, Agent, or Firm* — Dentons US LLP

(57) ABSTRACT

Disclosed is a method for transmitting data traffic, the method comprising: receiving control information for indicating that the transmission of data traffic of a specific application is suppressed; determining whether uplink data traffic is for the specific application suppressed by the control information, if the uplink data traffic is received from an application layer, deleting the uplink data traffic if it is indicated that the uplink data traffic is to be suppressed; and transmitting the uplink data traffic to a network entity if it is not indicated that the uplink data traffic is to be suppressed.

5 Claims, 7 Drawing Sheets

(51) Int. Cl.

| | |
|---|---|
| *H04L 12/24* | (2006.01) |
| *H04W 48/12* | (2009.01) |
| *H04W 76/18* | (2018.01) |
| *H04L 12/26* | (2006.01) |
| *H04L 12/859* | (2013.01) |
| *H04W 48/14* | (2009.01) |
| *H04W 48/18* | (2009.01) |
| *H04W 76/12* | (2018.01) |
| *H04W 48/02* | (2009.01) |
| *H04W 28/06* | (2009.01) |
| *H04W 88/02* | (2009.01) |

(52) U.S. Cl.
CPC ........... *H04W 60/04* (2013.01); *H04W 76/18* (2018.02); *H04L 43/16* (2013.01); *H04L 47/2475* (2013.01); *H04W 28/0242* (2013.01); *H04W 28/06* (2013.01); *H04W 48/02* (2013.01); *H04W 48/14* (2013.01); *H04W 48/18* (2013.01); *H04W 76/12* (2018.02); *H04W 88/02* (2013.01)

(58) Field of Classification Search
CPC ..... H04W 76/12; H04W 48/18; H04W 48/14; H04W 88/02; H04W 28/06; H04W 28/0242; H04L 41/0681; H04L 47/2475; H04L 43/16; H04L 47/00; H04L 47/10; H04L 63/0227; H04L 63/0236; H04L 63/10; H04L 63/101; H04L 67/32; H04L 67/327; H94L 47/32
See application file for complete search history.

(56) References Cited

U.S. PATENT DOCUMENTS

| | | | | |
|---|---|---|---|---|
| 9,264,979 | B2* | 2/2016 | Fong | H04W 12/08 |
| 9,326,311 | B2* | 4/2016 | Wirtanen | H04W 4/12 |
| 9,621,444 | B2* | 4/2017 | Liu | H04L 43/0835 |
| 9,913,305 | B2* | 3/2018 | Pinheiro | H04W 76/14 |
| 9,930,650 | B2* | 3/2018 | Jeong | H04M 15/57 |
| 10,051,507 | B2* | 8/2018 | Hsu | H04W 28/0231 |
| 10,075,902 | B2* | 9/2018 | Gogic | H04W 24/08 |
| 10,194,303 | B2* | 1/2019 | Wang | H04W 4/90 |
| 2010/0034083 | A1* | 2/2010 | Prakash | H04W 28/18 |
| | | | | 370/230.1 |
| 2012/0282889 | A1* | 11/2012 | Tanaka | H04J 11/0053 |
| | | | | 455/405 |
| 2012/0289151 | A1 | 11/2012 | Wu | |
| 2013/0077491 | A1* | 3/2013 | Cherian | H04W 28/10 |
| | | | | 370/235 |
| 2013/0183971 | A1* | 7/2013 | Tamaki | H04W 36/0061 |
| | | | | 455/436 |
| 2013/0244590 | A1 | 9/2013 | Nukala et al. | |
| 2013/0316675 | A1* | 11/2013 | Luna | H04W 4/24 |
| | | | | 455/408 |
| 2013/0340047 | A1* | 12/2013 | Runeson | H04W 12/06 |
| | | | | 726/4 |
| 2014/0024370 | A1 | 1/2014 | Sen et al. | |
| 2014/0133294 | A1 | 5/2014 | Horn et al. | |
| 2014/0295833 | A1 | 10/2014 | Rune et al. | |
| 2015/0036489 | A1* | 2/2015 | Rajadurai | H04W 28/0205 |
| | | | | 370/230 |
| 2015/0163813 | A1* | 6/2015 | Zhang | H04W 72/0493 |
| | | | | 370/329 |
| 2015/0223107 | A1* | 8/2015 | Zaus | H04L 47/2475 |
| | | | | 370/230 |
| 2016/0007331 | A1 | 1/2016 | Gauba et al. | |
| 2016/0205693 | A1 | 7/2016 | Lu et al. | |
| 2017/0201456 | A1* | 7/2017 | Siow | H04L 67/1008 |

FOREIGN PATENT DOCUMENTS

| | | |
|---|---|---|
| KR | 10-2013-0108436 A | 10/2013 |
| WO | 2004/036871 A1 | 4/2004 |
| WO | 2012/102594 A2 | 8/2012 |
| WO | WO 2015/071758 A1 * | 5/2015 |

OTHER PUBLICATIONS

S1-151041—#GPP TSG-SA WG1 Meeting #70 Los Cabos, Mexico Apr. 13-17, 2015, KDDI, Qualcomm, Intel, China Telecom, Control of Applications when third-party servers encounter difficulties (CATS) (pp. 1-2).

* cited by examiner

METHOD AND TERMINAL FOR TRANSMITTING DATA TRAFFIC IN WIRELESS COMMUNICATION SYSTEM

This application is a 35 USC § 371 National Stage entry of International Application No. PCT/KR2016/005558 filed on May 26, 2016, and claims priority to U.S. Provisional Application No. 62/166,142 filed on May 26, 2015, all of which are hereby incorporated by reference in their entireties as if fully set forth herein.

TECHNICAL FIELD

Following description relates to a wireless communication system, and more particularly, to a method for a terminal to transmit data traffic and the terminal.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Tasks

An object of the present invention is to efficiently control uplink data traffic transmitted by a terminal in a specific situation of a mobile communication system such as 3GPP EPS (Evolved Packet System).

Another object of the present invention is to minimize network signaling load while uplink data traffic of a terminal is controlled according to a situation of an application server.

The other object of the present invention is to improve a mechanism for sensing a situation of an application server for controlling uplink data traffic of a terminal.

The technical problems solved by the present invention are not limited to the above technical problems and other technical problems which are not described herein will become apparent to those skilled in the art from the following description.

Technical Solution

To achieve these and other advantages and in accordance with the purpose of the present invention, as embodied and broadly described, according to one embodiment, a method of transmitting data traffic, which is transmitted by a user equipment (UE) in a wireless communication system, includes the steps of receiving control information indicating transmission of data traffic of a specific application to be suppressed via an SIB (system information block) of an eNB (eNode B), receiving uplink data traffic from an application layer, determining whether or not the uplink data traffic corresponds to the data traffic of the specific application suppressed by the control information, if the uplink data traffic is indicated to be suppressed by the control information, deleting the uplink data traffic, and if the uplink data traffic is not indicated to be suppressed by the control information, transmitting the uplink data traffic to a network entity.

The control information is commonly transmitted to UEs belonging to the coverage of the eNB and the UE can preferentially apply the control information to a dedicated TFT (traffic flow template) preset to the UE.

The control information can include at least one selected from the group consisting of identification information of an application, operation information on the application, information on a time section to which an operation for the application is applied, and information on a UE mode to which the operation for the application is applied.

The determining step can determine in consideration of a source IP address and a destination IP address of the uplink data traffic.

The step of transmitting the uplink data traffic to the network entity can route the uplink data traffic via an EPS (evolved packet system) bearer indicated by the control information.

If a time section indicated by the control information arrives, the method can further include the step of deleting the control information or updating the control information using new control information.

To further achieve these and other advantages and in accordance with the purpose of the present invention, according to a different embodiment, a user equipment transmitting data traffic in a wireless communication system includes a transmitter, a receiver, and a processor configured to operate in a manner of being connected with the transmitter and the receiver, the processor configured to receive control information indicating transmission of data traffic of a specific application to be suppressed via an SIB (system information block) of an eNB (eNode B), the processor configured to receive uplink data traffic from an application layer, the processor configured to determine whether or not the uplink data traffic corresponds to the data traffic of the specific application suppressed by the control information, the processor, if the uplink data traffic is indicated to be suppressed by the control information, configured to delete the uplink data traffic, the processor, if the uplink data traffic is not indicated to be suppressed by the control information, configured to transmit the uplink data traffic to a network entity.

To further achieve these and other advantages and in accordance with the purpose of the present invention, according to a further different embodiment, a method of managing data traffic, which is managed by a first network entity in a wireless communication system, includes the steps of sensing uplink data traffic for a specific application transmitted to an application server for the specific application from a user equipment (UE), sensing whether or not a response for the uplink data traffic is transmitted to the UE from the application server, and if it is determined that the response is not transmitted to the UE, notifying occurrence of a problem occurred in the application server to a second network entity.

A determination procedure determining that the response is not transmitted to the UE is determined when the count of transmitting a signal transmitted to the UE from the application server is less than a threshold value and the number of UEs of which the count is less than threshold value is equal to or greater than a threshold.

If the uplink data traffic corresponds to a TCP (transmission control protocol) packet, the step of sensing whether or not a response is transmitted from the application server can sense whether or not a TCK ACK (acknowledgement) message is received.

If the uplink data traffic corresponds to an IP packet, the step of sensing whether or not a response is transmitted from the application server can sense whether or not an IP packet including a source IP and a destination IP opposite to a source IP and a destination IP of the IP packet is received.

The first network entity may correspond to a P-GW (packet data network gateway) and the second network entity may correspond to an eNB.

To further achieve these and other advantages and in accordance with the purpose of the present invention, according to a further different embodiment, a first network entity managing data traffic in a wireless communication system includes a transmitter, a receiver, and a processor configured to operate in a manner of being connected with the transmitter and the receiver, the processor configured to sense uplink data traffic for a specific application transmitted to an application server for the specific application from a user equipment (UE), the processor configured to sense whether or not a response for the uplink data traffic is transmitted to the UE from the application server, the processor, if it is determined that the response is not transmitted to the UE, configured to notify occurrence of a problem occurred in the application server to a second network entity.

Advantageous Effects

As is apparent from the above description, the embodiments of the present invention have the following effects.

First of all, it is able to prevent unnecessary uplink data traffic transmitted by a terminal according to a situation of an application server.

Secondly, it is able to control data traffic transmitted by a terminal while network load is minimized by improving a signaling process to the terminal.

Thirdly, it is able to prevent unnecessary data traffic control process performed by a terminal by improving a process of sensing a situation of an application server.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE

Mode for Invention

Figure 1:
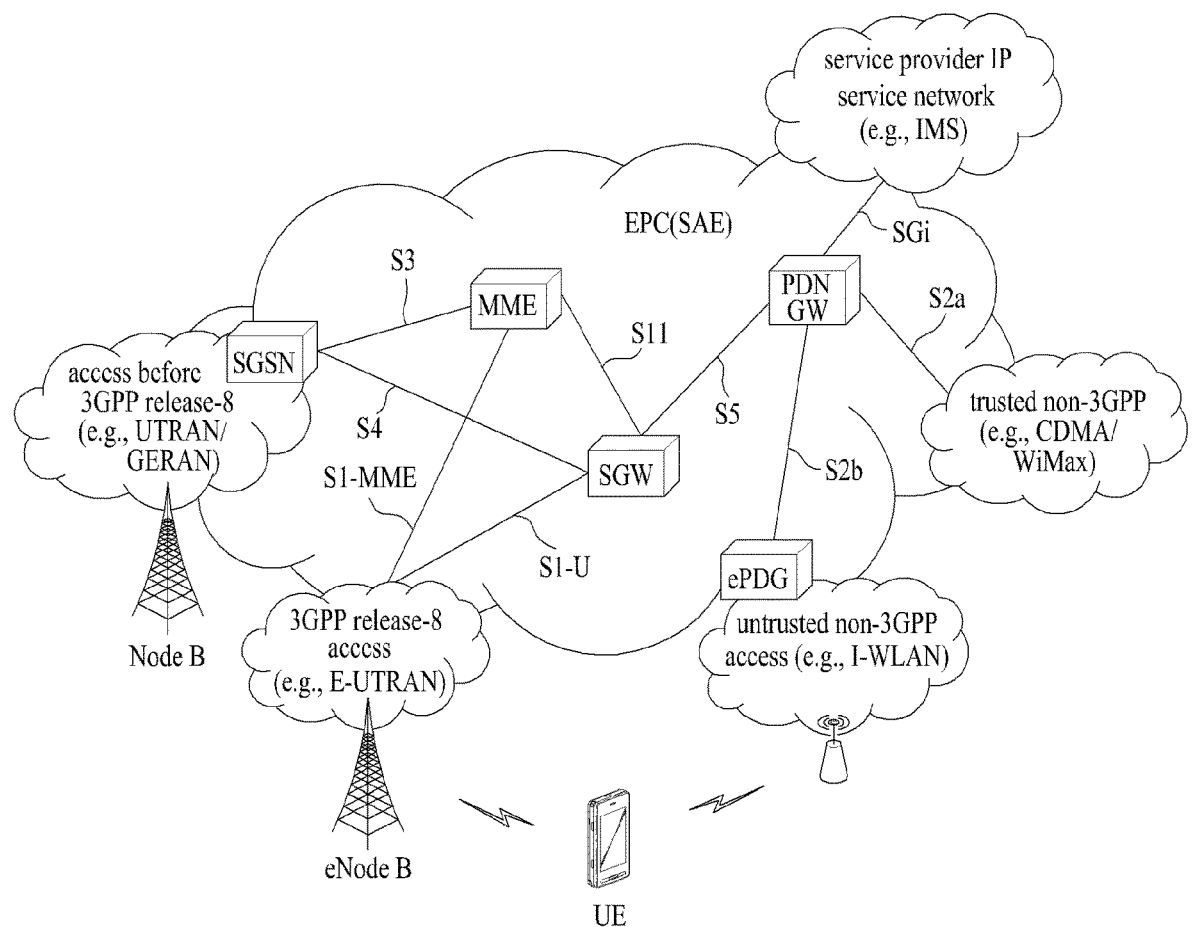
FIG. 1 is a diagram illustrating a brief structure of an evolved packet system (EPS) that includes an evolved packet core (EPC).

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

First of all, the terms used in this specification can be defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

Remote UE: This is a Prose-enabled public safety UE connected to EPC through Prose UE-to-Network Relay without service from E-UTRAN in a UE-to-Network Relay operation, that is, Prose-enabled public safety UE configured to receive PDN connection, whereas this is a Prose-enabled public safety UE that performs communication with other Prose-enabled public safety UE through a Prose UE-to-UE Relay in a UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

SLP (SUPL Location Platform): entity that controls Location Service Management and Position Determination. The SLP includes SLC(SUPL Location Center) function and SPC(SUPL Positioning Center) function. Details of the SLP will be understood with reference to Open Mobile Alliance (OMA) standard document OMA AD SUPL: "Secure User Plane Location Architecture".

USD (User Service Description): application/service layer transmits USD, which includes TMGI (Temporary Mobile Group Identity) for each MBMS service, start and end time of session, frequencies, and MBMS service area identities (MBMS SAIs) information belonging to MBMS service area, to the UE. Details of the USD will be understood with reference to 3GPP TS 23.246.

ISR (Idle mode Signaling Reduction): When a UE frequently moves between E-UTRAN and UTRAN/GERAN, waste of network resources occurs due to a repeated position registration process. As a method for reducing such a waste, when the UE is in an idle mode, after position registration for MME and SGSN (hereinafter, these two nodes will be referred to as mobility management node) is performed through the E-UTRAN and the UTRAN/GERAN, a separate position registration is not performed in the case that movement between two RATs (Radio Access Technologies) which are already registered or cell reselection is performed. Therefore, if DL (downlink) data to the corresponding UE is arrived, paging is transmitted to the E-UTRAN and the UTRAN/GERAN at the same time to successfully discover the UE, whereby the DL data may be transferred to the discovered UE. [see 3GPP TS 23.401 and 3GPP TS 23.060]

Mission Critical Push To Talk: a group communication service that provides a fast establishment time, a capability capable of processing a large scaled group, powerful security, and priority handling.

ANDSF (Access Network Discovery and Selection Function): This is one of network entities for providing a policy for discovering and selecting an access that can be used by a UE on an operator basis.

ISRP (Inter-System Routing Policy): This is a protocol defined by the operator to indicate which one will be used by the UE for routing of IP traffic among several radio access interfaces. The ISRP may include three types of protocols as follows, as a policy for defining an access network preferred (i.e., having a high priority) or restricted to route/steer a packet service (or an IP flow or IP traffic or applications). That is, the ISRP may be divided into an IP flow mobility (IFOM) protocol, a multi access PDN connectivity (MAPCON) protocol, and a non-seamless WLAN offload (NSWO) protocol as follows.

IFOM (IP Flow Mobility) protocol: This protocol is in regards to a list in which access technologies/access networks to be used by the UE are arranged according to a priority, when traffic matched to a specific IP traffic filter can be routed on a specific APN (Access Point Name) or on a random APN. Further, this protocol may designate for which radio access the traffic matched to the specific IP traffic filter is limited on the specific APN or on the random APN.

MAPCON (Multi Access PDN Connectivity) protocol: This protocol is a list in which the access technologies/access networks to be used by the UE are arranged according to the priority when a PDN connection for the specific APN can be routed. Further, this protocol may designate for which radio access a PDN connection to a specific APN will be limited.

NSWO(Non-seamless WLAN offload) protocol: This protocol designates whether certain traffic will be offloaded or not offloaded non-seamlessly to a WLAN.

ISMP (Inter-System Mobility Policy): This is a set of protocols defined by an operator to have an impact on an inter-system mobility decision made by the UE. When the UE can route IP traffic on a single radio access interface, the UE may use ISMP to select the most appropriate access technology type or access network in a given time.

RAN rule: This is a rule received from the network and is called RAN support information. The RAN rule is also called WLAN interworking supported by the RAN used without ANDSF ISRP/ISMP. When the RAN rule for moving traffic to the WLAN is satisfied, an access stratum (AS) layer of the UE delivers a move-traffic-to-WLAN indication and a WLAN identifier together to a higher layer of the UE. Alternatively, when the RAN rule for moving the traffic to the 3GPP access is satisfied, the AS layer of the UE delivers a move-traffic-from-WLAN indication to the higher layer of the UE. 3GPP. 3GPP TS 23.401, TS 23.060, TS 23.402, TS 36.300, TS 36.304, TS 36.331, TS 25.304, and TS 25.331 may be incorporated herein for detailed descriptions on the RAN rule.

Local Operating Environment Information: This is a set of implementation specific parameters which describe the local environment in which the UE is operating.

Network-Based IP Flow Mobility (NBIFOM): This is IP flow mobility based on network based mobility protocol (GTP or PMIP).

UE-initiated NBIFOM: This is NBIFOM in which the UE initiates IP flow mobility.

Network-initiated NBIFOM: This is NBIFOM in which the network initiates IP flow mobility.

Multi-access PDN connection: This is a PDN connection in which traffic can be routed through the 3GPP access and/or the WLAN access. Each IP flow is routed only through one access at one instance.

Routing filter: This is a set of IP header parameter values/ranges of a packet flow used to identify IP flow for the purpose of routing.

Routing access type: This is a type of an access for routing a set of IP flows of PDN connection (3GPP access or WLAN access.

Routing Rule (RR): This is a set of information that enables association between the routing filter and the routing access type.

1. Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN |

TABLE 1-continued

| Reference point | Description |
|---|---|
| | connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
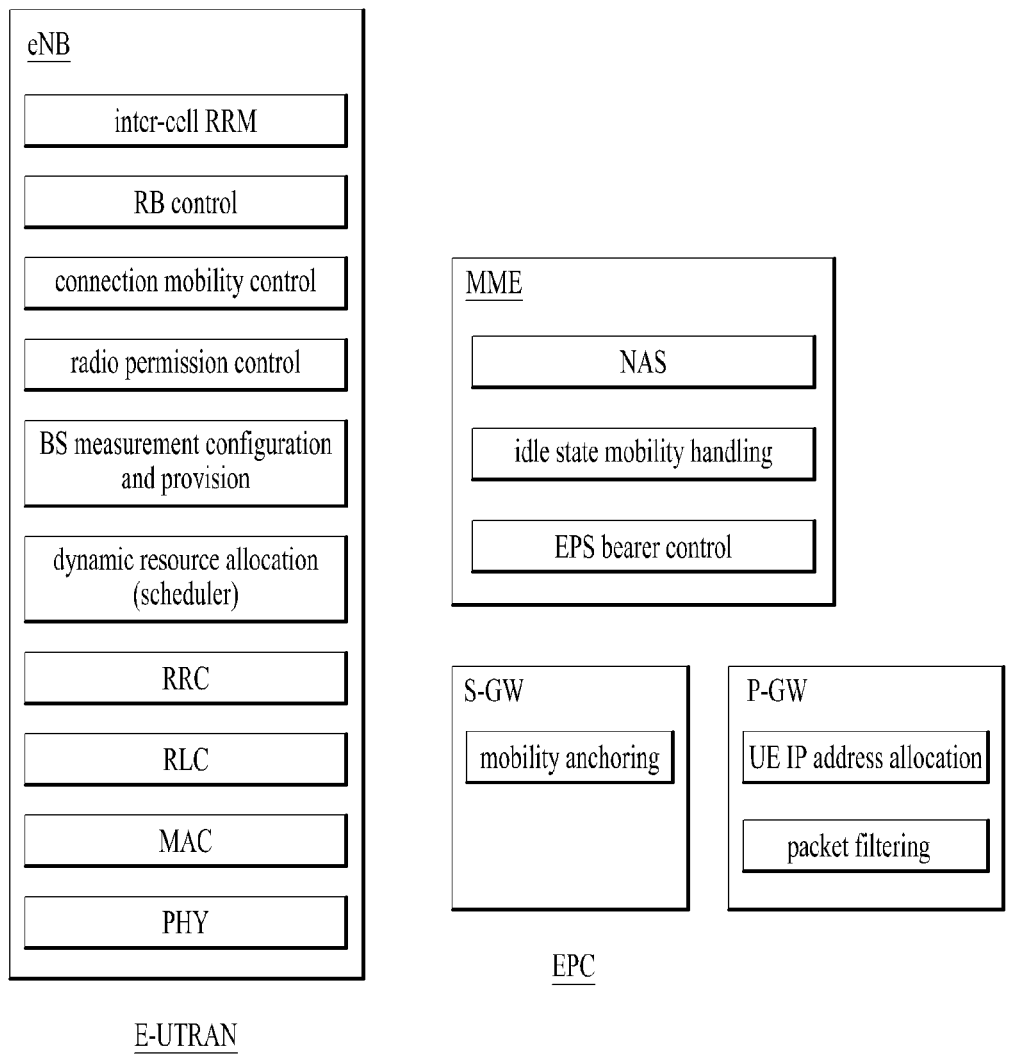
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
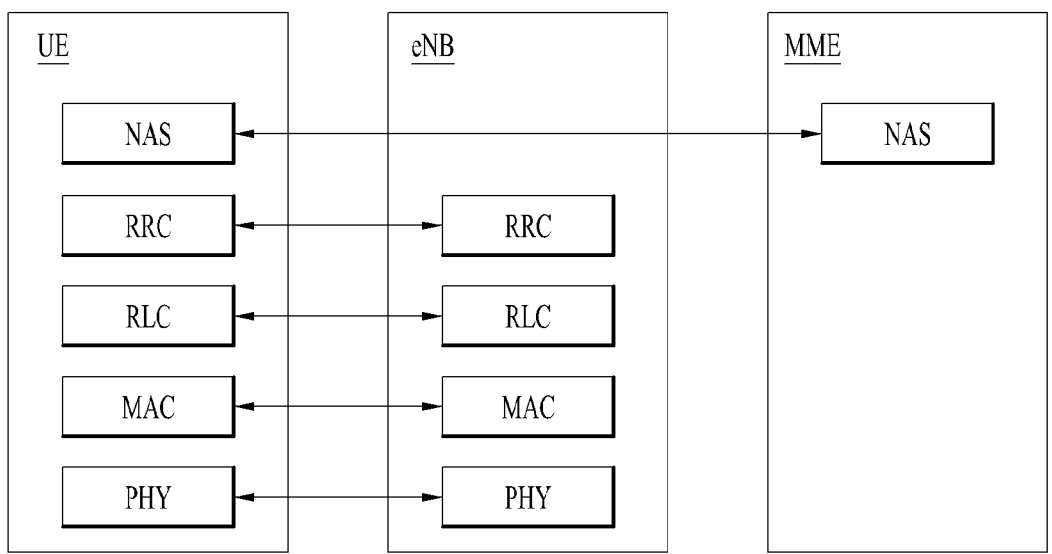
FIG. 3 is an exemplary diagram illustrating a structure of a radio interface protocol on a control plane.
Figure 4:
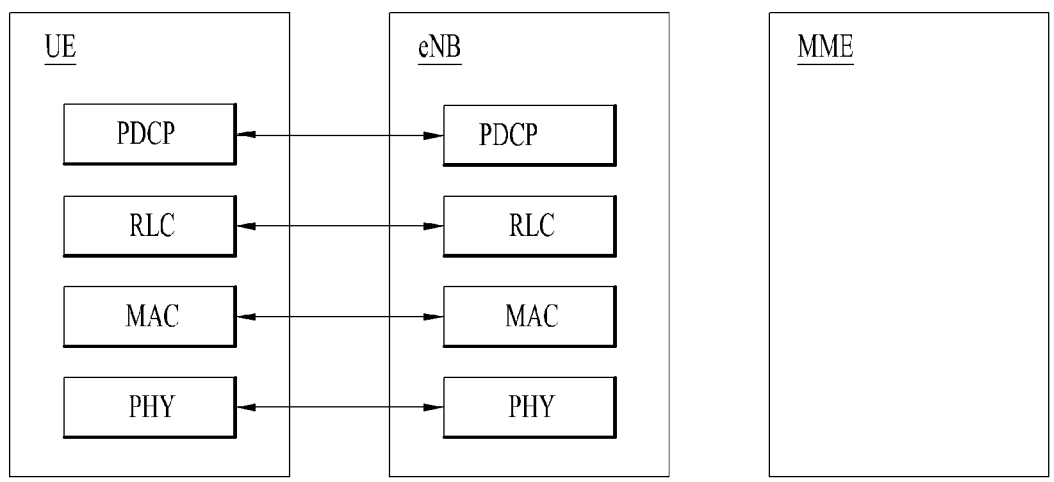
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CON- NECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
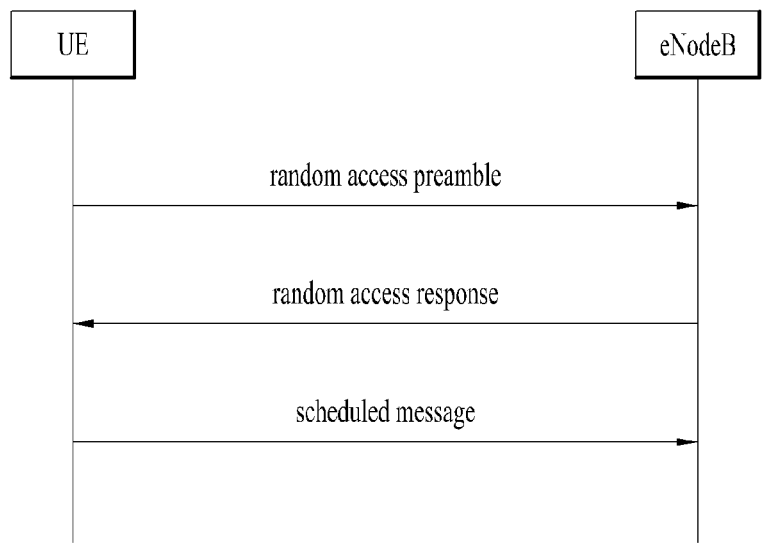
FIG. 5 is a flowchart illustrating a random access procedure.

FIG. 5 is a flowchart illustrating a random access procedure in 3GPP LTE.

The random access procedure is performed for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
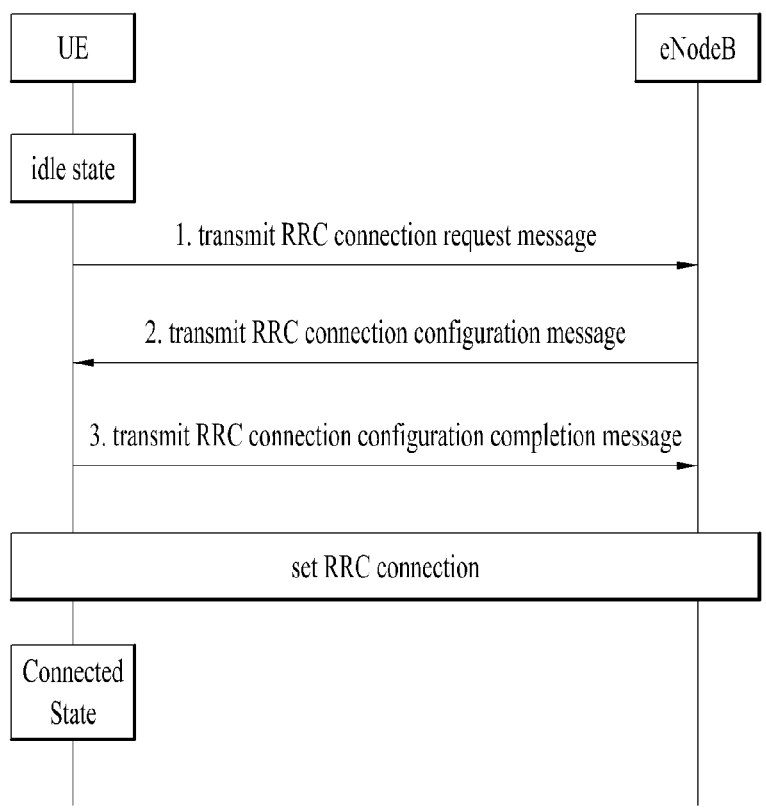
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

2. Method of Transmitting Data Traffic Proposed in the Present Invention

A smartphone corresponding to a user terminal has many applications installed in the smartphone and the applications access an application server using cellular connection or Wi-Fi connection. The application server transceives data traffic with the terminal and provides a service to a user via the terminal.

Meanwhile, a service flow is described in the following when a cellular network is used. First of all, a terminal accesses the cellular network to receive internet connection. If internet data traffic is generated by an application installed in the terminal, the data traffic is forwarded to an application server via the cellular network. The application server transmits data traffic to the terminal in response to the data traffic. The application of the terminal provides a service to a user using the data traffic received from the application server.

Meanwhile, according to a current cellular network, a terminal and an eNB are connected wirelessly and the eNB, a core network, and the Internet are connected with each other in wired. In order to transmit data in a radio section, it is necessary for a communication service provider to secure a frequency band and it costs money. Hence, in the aspect of the communication service provider, it is necessary to prevent such a situation as using a frequency band for unnecessary data transmission as much as possible. And, in the aspect of a user using a wireless communication service, since a terminal has a battery limit, it is preferable that data transmitted to an eNB from the terminal via a radio section is to be meaningful.

Occasionally, a user of a terminal (e.g., a smartphone) may fails to properly receive a service of a specific application installed in the terminal. This occurs due to various reasons including a problem occurred in an application server itself supporting the application, a problem occurred in a network to which the application server belongs thereto, and the like.

In this case, when the user fails to receive an application service due to a reason rather than a problem of the terminal itself or a problem of a communication network to which the user of the terminal subscribes, if the terminal continuously transmits data generated by an application via a radio section, it may cause a problem. In particular, it may cause power waste of the terminal and may unnecessarily waste a frequency resource of a communication service provider. In particular, although a terminal successfully transmits data of an application to an eNB and the data is successfully delivered to a core network of a communication service provider, if the data is not properly delivered in an external network (application server), operations of the terminal and the eNB are wasted in a radio section.

In order to solve the abovementioned problem, if a problem occurs in a specific application, in particular, if a problem occurs in an application server itself or a problem occurs in a network at which an application service provider is located (i.e., if it is not a problem occurred in a network of a communication service provider supporting a terminal), it is required to have a mechanism for processing data traffic to prevent a terminal from unnecessarily transmitting data in a radio section.

In order to solve the abovementioned problem, it may consider a method that an application server in which a problem occurred directly informs a communication service provider or a network entity (e.g., P-GW) of the problem and the network entity forwards the information to a terminal or an eNB. However, if the problem occurs in the application server, it is highly probable that a function of informing the network entity of the problem is not properly working as well. And, in the aspect of a manager of a mobile communication network, since there are a lot of applications incapable of being identified by a core network, it is practically impossible to inform each of applications of access information of a P-GW. Although a network manager is able to identify all of external applications, if access information of a network entity is opened to an external application service provider, a core network can be exposed to DDoS (Distribute Denial of Service) attack.

Figure 7:
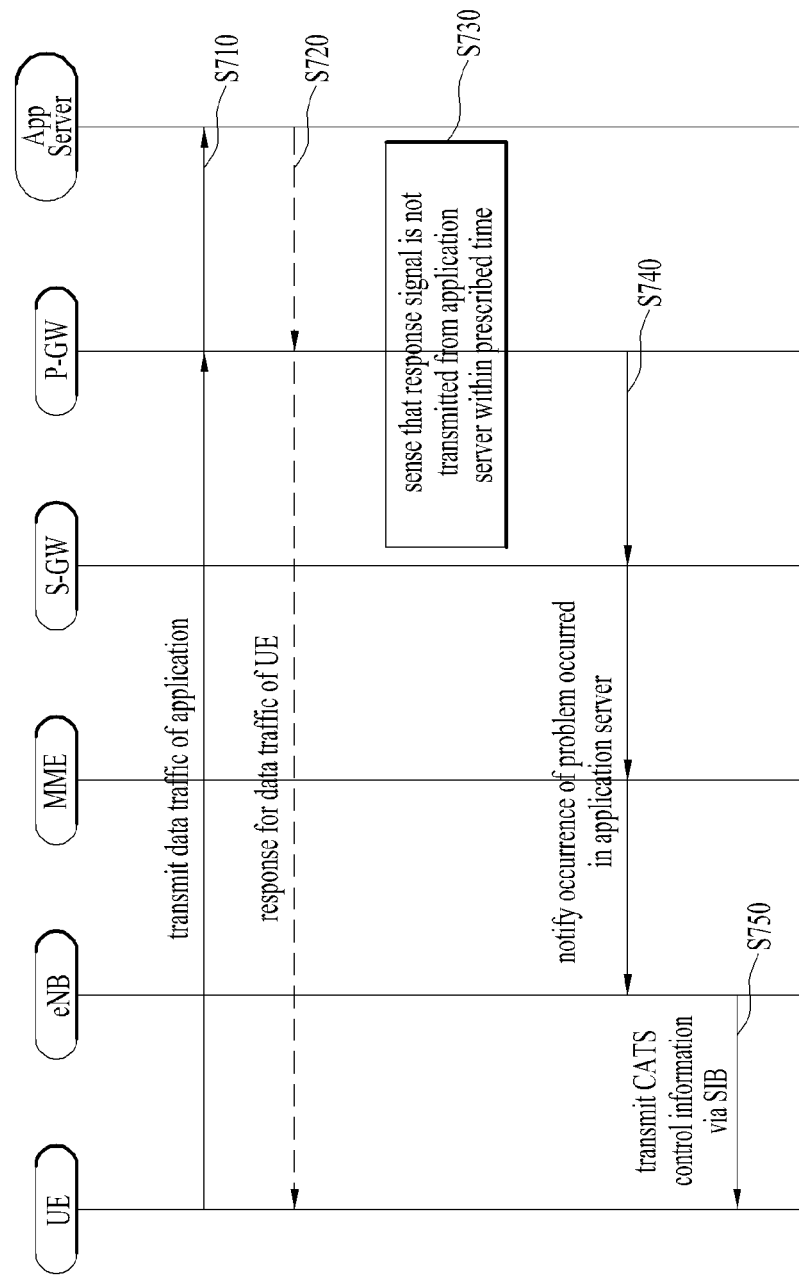
FIG. 7 is a flowchart illustrating a signaling process between network entities according to a proposed embodiment.

FIG. 7 is a flowchart illustrating a signaling process between network entities according to a proposed embodiment. In the following, a method of identifying a problem of an application server in a mobile communication service provider network or a cellular network is proposed to solve the abovementioned problems. For example, a P-GW (hereinafter, the P-GW can be replaced with an S-GW, a PCEF (policy and charging enforcement function), a PCRF (policy and charging rules function)) detects data traffic transmitted to an application server by a UE [S710]. If a response is not received from the application server for more than prescribed time [S720], the P-GW can determine it as a problem occurs in the application server (or, an application provider) [S730].

In the abovementioned procedures, if a network is congested, it may lose a partial packet due to the characteristic of an internet data packet network. In particular, if a network entity detects the lost of one or two packets and immediately determines it as the application server of the packets is abnormal, access of the UE can be excessively restricted. As a result, QoS provided to a user can be deteriorated. Hence, if a phenomenon of failing to receive a response from the application server is repeated more than a prescribed count or the same phenomenon occurs in UEs equal to or greater than a prescribed number, the network entity (e.g., P-GW) may determine it as a problem occurs in the application server.

Information on the number of occurrences of the phenomenon, information on a time section at which the occurrence of the phenomenon is detected, and information on the number of UEs can be configured in an EPS bearer unit when each EPS bearer is generated. For example, when a UE initiates an attach procedure, an MME collects information on the UE from a HSS and forwards the information to the P-GW. By doing so, the P-GW can configure information on a time section, the number of occurrences, and the like appropriate for subscription information of each UE. In the step S730, based on the preconfigured information, the P-GW determines that a data packet is not normally transmitted to the UE from the application server.

Meanwhile, when the P-GW analyzes the data traffic of the steps S710 and S720 in the step S730, the P-GW can analyze the data traffic transmitted and received between the UE and the application server using an IP protocol or a TCP (transmission control protocol). For example, the P-GW can analyze the data traffic by detecting a TCP packet transmitted by the UE and a TCP ACK message which is not received within prescribed time. Or, the P-GW can analyze the data traffic by detecting whether or not an IP packet, which is opposite to a source IP and a destination IP of an IP packet header transmitted by the UE, is received within prescribed time. When the P-GW analyzes the data traffic, the P-GW may use a DPI (deep packet inspection) function.

In general, a header is processed at an IP packet level and an upper layer message (UDP (user data gram protocol), TCP header, etc.) is processed at both ends of a peer-to-peer client rather than the IP packet level in a network transmission network. In particular, a node (or, a switch/router) located at the center of the network receives a packet, checks a destination IP address existing at an IP header of the packet only, and delivers the packet to a next node. The node does not process a TCP header or a UDP header corresponding to a data part of an IP packet. The TCP header or the UDP header is processed at both ends at which an application is located, i.e., the application server or the UE.

If the P-GW recognizes that a problem occurs in the application server (or, a provider) according to the aforementioned procedures, the P-GW informs a management entity (e.g., MME, management server, etc.) of the network and other entities (e.g., S-SW, eNB, PCRF, PCEF, etc.) of the occurrence of the problem [S740]. Hence, network nodes belonging to the communication network are able to know an external application server in which the problem occurs.

In this case, the MME may inform UEs related to an application among UEs managed by the MME of the problem of the application server. Yet, since the MME is unable to know which UE is going to transmit data of the application in the future, the MME should deliver the problem of the application to all UEs managed by the MME. To this end, it is necessary for the network to perform paging to the UE. In this case, a process of switching the UE to an ECM connection mode (EPS connection management-connected mode) and a process of delivering information to the UE via a DRB (data radio bearer) are additionally required, thereby increasing signaling load of the network.

Hence, according to the proposed embodiment, if the P-GW recognizes that the problem occurs in the application provider, the P-GW also transmits information on an application and an application server in which the problem occurs to a server that manages contents of an SIB (system information block) transmitted from each cell. If an eNB receives information indicating that a problem occurs in a specific application server, the eNB delivers the information to UEs in a cell managed by the eNB using SIB [S750]. In the following, the information transmitted to the UEs via the SIB is referred to as CATS (Control of Applications when Third party Servicers encounter difficulties) control information. The CATS control information can be transmitted to the UE from the eNB via RRC signaling. RRC layer of the UE receives the CATS control information and forwards the information to a higher layer.

Specifically, the CATS control information can include contents described in the following. The CATS control information corresponds to information designating a specific application and can include at least one selected from the group consisting of a name of an application, an application ID designated according to an OS, a manufacturer of an application, information indicating a specific IP address and a port, and information following a TFT (traffic flow template) format. The CATS control information corresponds to information on an operation to be applied to a specific application and can include information on suppression, resume, and the like. The CATS control information corresponds to time information on an operation to be applied to a specific application and can include information on duration for which the operation is applied (e.g., a length of a time section, end time, time until a new operation is known, etc.). And, the CATS control information corresponds to information on a range to which an operation is applied and can include information on whether or not the operation is applied to an RRC idle mode UE, information on whether or not the operation is applied to an RRC connected mode UE, and information on whether or not the operation is applied to both the idle mode UE and the connected mode UE.

Figure 8:
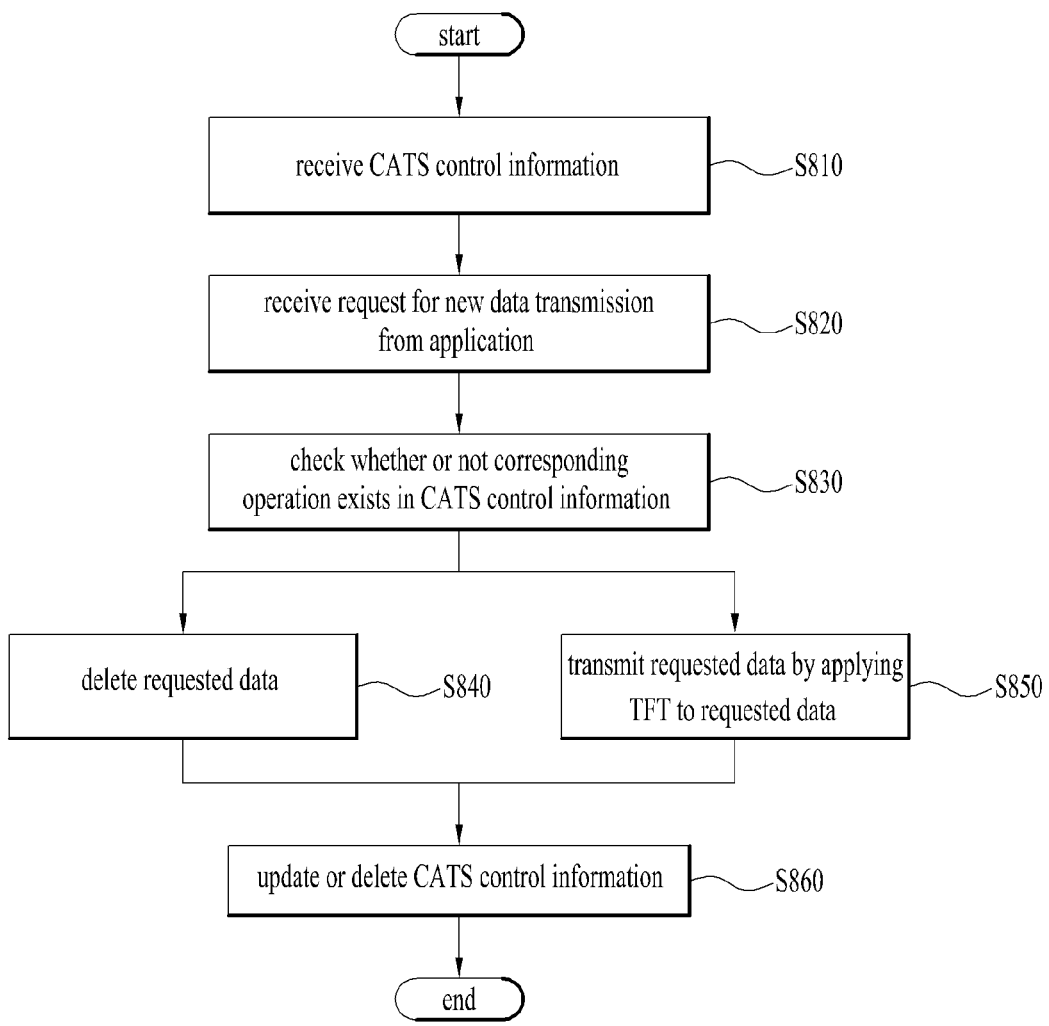
FIG. 8 is a flowchart illustrating a method for a terminal to transmit data traffic according to a proposed embodiment.

In the following, an operation of a UE, which has received the CATS control information, is explained. FIG. 8 is a flowchart illustrating a method for a terminal to transmit data traffic according to a proposed embodiment.

If a UE (i.e., a communication layer of the UE) receives the CATS control information, the UE stores the CATS control information [S810] and operates according to the CATS control information when transmission of a new data is requested by an application layer [S820]. First of all, the UE checks whether or not an operation corresponding to the data requested by the application exists in the CATS control information [S830]. For example, the UE checks whether or not a name or an identifier of an application, which has generated the requested data traffic, is included in the CATS control information and checks whether or not an IP address of the requested data traffic and information matched with a port are included in the CATS control information. In other word, the UE checks whether or not the requested data traffic corresponds to data to be controlled according to the CATS control information.

If an operation corresponding to the requested data traffic exists in the CATS control information, the UE operates according to the indication indicated by the CATS control information. For example, if the CATS control information indicates transmission of the requested data traffic to be suppressed, the UE deletes the data traffic [S840]. In this case, the UE can notify an application of the deleted data traffic that it is unable to transmit data due to a problem of a corresponding server. Or, the UE can indicate the application not to transmit additional data. And, the UE emulates a packet notifying the problem of the server to the application of the deleted data traffic and can transmit the packet to a higher layer. The abovementioned procedure can be implemented in a form of various messages such as an ICMP (Internet Control Message Protocol) type 3 (destination unreachable message), TCP NACK, and the like.

Meanwhile, if transmission is not suppressed by the CATS control information, the UE applies TFT to a data packet to determine an EPS bearer to be used for performing transmission [S850]. Although it is determined to transmit a data packet, the UE operates by checking elements to be received from an eNB and additionally considered such as ACDC (Application specific Congestion control for Data Communication), SSAC (Service Specific Access Control), ACB (access class barring), and the like.

Meanwhile, if new CATS control information is received from the eNB, the UE deletes or updates the previously stored CATS control information [S860]. For example, while the previously stored CATS control information indicates data traffic of a specific application to be suppressed, the new CATS control information may indicate the data traffic of the specific application to be resumed. In particular, the CATS control information is up to date using the received CATS control information.

Meanwhile, although data traffic transmission is blocked via the CATS control information due to a problem of an application server or a network to which the application server belongs, the problem of the application server or the network is going to be solved at last. Hence, if the problem is solved, it is necessary to transmit data traffic of a corresponding application. In this case, if the UE consistently monitors whether or not a problem of a specific application server or a network is solved, power of the UE can be excessively consumed. Hence, it is necessary for the UE to appropriately manage the previously stored CATS control information.

For example, if information on update timing is transmitted in a manner of being included in the CATS control information, the UE may recognize that the CATS control information is valid until the update timing. CATS control information for suppressing data traffic generated by an application Y, which is received by the UE at X=1 timing, may also include information on a time section K. In this case, the UE can recognize that the CAT control information is valid until 1+K timing and suppression of the data traffic is maintained until the timing. It is not necessary to additionally receive CATS control information on a corresponding application until the timing is elapsed. Subsequently, the UE additionally receives new CATS information after the 1+K timing and checks whether or not the data traffic of the application is still suppressed. If the suppression is released and transmission of the data traffic is resumed, the UE deletes the previously stored CATS control information. If the suppression is still maintained, the UE does not transmit the data traffic of the application until 1+K+K timing.

Meanwhile, the aforementioned time information can be differently configured according to an application. In particular, the P-GW can differently configure duration of a specific operation according to statistic information on an application (e.g., average application usage, load status, the number of users using the application, the number of UEs of the application). The time information is transmitted to a UE via SIB in a manner of being included in CATS control information and operations different from each other according to an application are indicated during different time.

Meanwhile, it may be difficult for a communication layer of a UE to obtain information of an application layer depending on an operating system or an implementation type of the UE. For example, android operating system uses an application identifier randomly allocated by the android operating system rather than an application name internally set to each application to request transmission of data traffic. Hence, although a UE is manufactured by the same manufacturer, it may allocate an identifier of a different operating system to the same application. In this case, if CATS control information suppresses transmission of data traffic on the basis of identification information of the application, UEs different from each other may block data traffic of applications different from each other.

Hence, according to one embodiment proposed in the present invention, CAT information can be regarded as a new TFT. Since a TFT corresponds to a format representing a source IP address and a destination IP address of traffic, the TFT may induce a plurality of UEs to perform the same operation without using a name or an identifier of a specific application.

According to the abovementioned embodiment, CATS control information transmitted to a UE by an eNB can include TFT information and information on a corresponding operation. The TFT information corresponds to information indicating a TFT corresponding to a management target (i.e., an application that data traffic transmission is suppressed or resumed) and the information on the corresponding operation may correspond to information indicating suppression or resumption.

Meanwhile, since both a bearer set to a UE and a service to which a UE subscribes are different according to a UE, each UE receives information on a dedicated TFT from an MME and sets a TFT. In this case, since CATS control information received from an eNB by a UE is commonly applied to all UEs belonging to a region of the eNB, the CATS control information may become a common TFT. In this case, the UE should determine a TFT to be preferentially applied among the common TFT received via the CATS control information and the dedicated TFT set to each UE. If priority or relation is not determined in an operation between the TFTs, the UE may consider that the TFT of the CATS control information has a lower priority. As a result, it may have a problem that the UE transmits data traffic of an application suppressed by the CATS control information. Hence, according to the embodiment proposed by the present invention, it is necessary for the UE to determine priority between a commonly received TFT and a dedicatedly received TFT. The UE may operate as follows.

When a UE receives uplink packets, the UE first check whether the packet should be discarded or not, using information included in the CATS control information. If the CATS control information indicates that some packets should be discarded/suppressed and if the uplink packet satisfies the criterion included in the CATS control information, the uplink packets are discarded. If the uplink packets are not discarded, the UE routes uplink packets to different EPS bearers based on uplink packet filters in the TFTs assigned to these EPS bearers.

According to a different embodiment, When a UE receives CATS control information from network which indicates that traffic to the specific applications should be suppressed, the TFTs, which indicates the characteristic of traffic to be suppressed and included in the CATS control information is regarded as having the lower evaluations precedence index than any other TFTs that the UE has (for example, the TFTs which the UE has received by dedicated signaling). For the uplink packets which has a match with TFT included in the CATS control information, the uplink packets are discarded. For the uplink packets which has a match with TFT included in the CATS control information, it is assumed that there is no matching EPS bearer for it. When there is no TFT that is configured for the UE, if the UE receives CATS control information which suppress the traffic to the specific applications, the UE regards the TFTs, which indicates the characteristic of traffic to be suppressed and included in the CATS control information is regarded as having the lower evaluations precedence index.

3. Device Configurations

Figure 9:
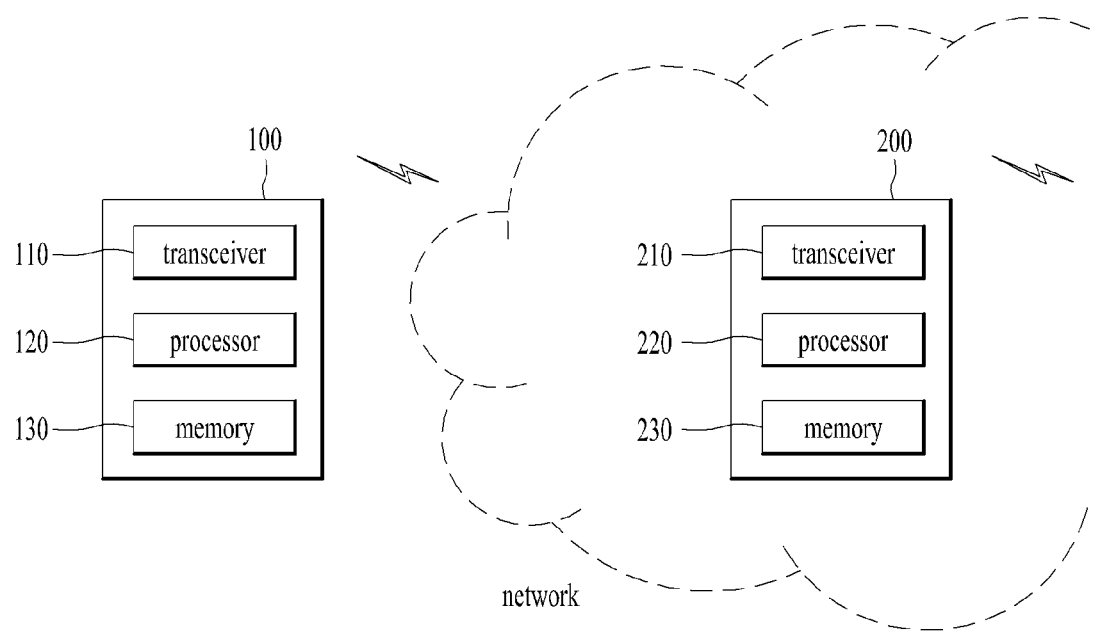
FIG. 9 is a diagram illustrating a configuration of a node device according to a proposed embodiment.

FIG. 9 is a diagram illustrating configurations of node devices according to a proposed embodiment.

A user equipment (UE) 100 may include a transceiver 110, a processor 120, and a memory 130. The transceiver 110 may be configured to transmit and receive various signals, data, and information to/from an external device. Alternatively, the transceiver 110 may be implemented with a combination of a transmitter and a receiver. The UE 100 may be connected to the external device by wire and/or wirelessly. The processor 120 may be configured to control overall operations of the UE 100 and process information to be transmitted and received between the UE 100 and the external device. Moreover, the processor 120 may be configured to perform the UE operation proposed in the present invention. The memory 130, which may be replaced with an element such as a buffer (not shown in the drawing), may store the processed information for a predetermined time.

Referring to FIG. 9, a network node 200 according to the present invention may include a transceiver 210, a processor 220, and a memory 230. The transceiver 210 may be configured to transmit and receive various signals, data, and information to/from an external device. The network node 200 may be connected to the external device by wire and/or wirelessly. The processor 220 may be configured to control overall operations of the network node 200 and process information to be transmitted and received between the network node device 200 and the external device. Moreover, the processor 220 may be configured to perform the network node operation proposed in the present invention. The memory 230, which may be replaced with an element such as a buffer (not shown in the drawing), may store the processed information for a predetermined time.

The specific configurations of the UE 100 and the network node 200 may be implemented such that the aforementioned various embodiments of the present invention can be independently applied or two or more embodiments can be simultaneously applied. For clarity, redundant description will be omitted.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein.

INDUSTRIAL APPLICABILITY

Although the method of transmitting data traffic is described centering on examples applied to 3GPP LTE system, it may also be applicable to various wireless communication systems including IEEE 802.16x and 802.11x system. Moreover, the proposed method can also be applied to mmWave communication system using a microwave frequency band.

What is claimed is:

1. A method of transmitting uplink data traffic by a user equipment (UE) in a wireless communication system, the method comprising:
receiving, via a System Information Block (SIB) from a Base Station (BS), Control of Applications when Third party Servicers encounter difficulties (CATS) control information informing the UE of suppression of data traffic related to a specific application, wherein the CATS control information includes (i) information regarding a Radio Resource Control (RRC) mode to which the suppression is applied, and (ii) information regarding a time duration for which the suppression is applied;
receiving the data traffic within the time duration;
based on the UE being in the RRC mode, deleting the uplink data traffic; and
based on the UE not being in the RRC mode, transmitting the uplink data traffic to a network entity,
wherein the RRC mode comprises an RRC idle mode,
wherein based on receiving the data traffic after the time duration elapses, the UE deletes the uplink data traffic, and
wherein based on receiving new CATS control information, the UE deletes the CATS control information and applies the new CATS control information, even within the time duration.

2. The method of claim 1, wherein the CATS control information is transmitted to UEs belonging to the coverage of the BS and wherein the UE applies the CATS control information to a dedicated TFT (traffic flow template) preset to the UE.

3. The method of claim 1, wherein the CATS control information further informs the UE of at least identification information for the specific application, operation information for the specific application, or information on a time period during to which the operation information for the specific application applies.

4. The method of claim 1, wherein transmitting the uplink data traffic to the network entity comprises routing the uplink data traffic via an Evolved Packet System (EPS) bearer indicated by the CATS control information.

5. A user equipment transmitting uplink data traffic in a wireless communication system, the user equipment comprising:
a transceiver; and
a processor that:
receives, via a System Information Block (SIB) from a Base Station (BS), Control of Applications when Third party Servicers encounter difficulties (CATS) control information informing the processor of suppression of data traffic related to a specific application, wherein the CATS control information includes (i) information regarding a Radio Resource Control (RRC) mode to which the suppression is applied, and (ii) information regarding a time duration for which the suppression is applied, receives the data traffic within the time duration, based on the UE being in the RRC mode, deletes the uplink data traffic; and based on the UE not being in the RRC mode, transmits the uplink data traffic to a network entity, wherein the RRC mode comprises an RRC idle mode, wherein based on receiving the data traffic after the time duration elapses, the UE deletes the uplink data traffic, and wherein based on receiving new CATS control information, the UE deletes the CATS control information and applies the new CATS control information, even within the time duration.

* * * * *